US011537117B2

(12) United States Patent
Bergstrom et al.

(10) Patent No.: US 11,537,117 B2
(45) Date of Patent: Dec. 27, 2022

(54) METHOD FOR SETTING ALARM LEVELS FOR A MACHINE

(71) Applicant: Aktiebolaget SKF, Gothenburg (SE)

(72) Inventors: Joakim Bergstrom, Luleå (SE); Per-Erik Larsson, Lulea (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/384,846

(22) Filed: Jul. 26, 2021

(65) Prior Publication Data

US 2022/0083036 A1 Mar. 17, 2022

(30) Foreign Application Priority Data

Sep. 15, 2020 (DE) .......................... 102020123994.7

(51) Int. Cl.
G05B 23/02 (2006.01)
(52) U.S. Cl.
CPC ....... G05B 23/027 (2013.01); G05B 23/0235 (2013.01); G05B 23/0283 (2013.01); G05B 23/0297 (2013.01)
(58) Field of Classification Search
None
See application file for complete search history.

(56) References Cited

U.S. PATENT DOCUMENTS

| 7,965,600 | B2 * | 6/2011 | Kakimoto | G11B 20/10009 369/53.2 |
| 2007/0067678 | A1 * | 3/2007 | Hosek | G05B 23/0235 714/25 |
| 2018/0158314 | A1 | 6/2018 | Larsson | |
| 2019/0332102 | A1 * | 10/2019 | Larsson | G01M 13/00 |
| 2021/0003476 | A1 | 1/2021 | Larsson | |
| 2021/0003477 | A1 | 1/2021 | Larsson | |

\* cited by examiner

*Primary Examiner* — Mohammad Ali
*Assistant Examiner* — David Earl Ogg
(74) *Attorney, Agent, or Firm* — Garcia-Zamor Intellectual Property Law; Ruy Garcia-Zamor; Bryan Peckjian

(57) ABSTRACT

A method for setting alarm levels for a machine provides defining at least one condition indicator reflecting the condition of the machine with respect to a defect to be monitored of the machine, the at least one condition indicator defined from machine kinematic data, recording measurements of process related parameters during a predetermined period during which the machine is operating normally, calculating at least one condition indicator value for the at least one condition indicator) using machine condition data, determining a graph of the at least one condition indicator value as a function of a first process related parameter chosen from the measured process related parameters, dividing the graph into operating classes, each operating class being representative of different operating conditions of the machine, calculating an alarm level value for each operating class, setting the determined alarm level value at the midpoint of each operating class.

8 Claims, 2 Drawing Sheets

METHOD FOR SETTING ALARM LEVELS FOR A MACHINE

CROSS-REFERENCE TO RELATED APPLICATIONS

This application claims priority to German Patent Application no. 102020123994.7, filed Sep. 15, 2020, the contents of which is fully incorporated herein by reference.

TECHNICAL FIELD OF THE INVENTION

The present invention relates to machine diagnostics and more particularly to setting alarm levels for different operating conditions to detect machine defects.

BACKGROUND OF THE INVENTION

Machine diagnostics are utilized to implement machine health monitoring. A main objective in machine diagnostics is to detect defects in machinery as early as possible.

A common problem is that the operating conditions of machines are constantly changing and consequently the measurement of a condition indicator is changing as well making difficult to set appropriate alarm levels and increasing the risk of false alarms.

An inappropriate definition of the alarm levels can lead to less reliable alarms with risk of missing defects or false alarm triggering.

One known method is to set manually different alarm levels for multiple operating conditions performed by machine condition monitoring specialists.

However, this method requires highly skilled people and a lot of manual work.

The documents US2018/158314 discloses a method of trend analysis and tuning of alarm parameters for a machine, and the documents US2019/332102 discloses an auto-diagnosis method for executing a volume of machine health monitoring of machine parts by an analysis of measurements of the machine parts to detect defects therein.

However, the determination of the alarm levels is not accurate enough.

There is a need to avoid at least some of the previously mentioned drawbacks, especially by enhancing the determination of the alarm levels.

SUMMARY OF THE INVENTION

According to an aspect, a method for setting alarm levels for a machine is proposed.

The method comprises: defining at least one condition indicator reflecting the condition of the machine with respect to a defect to be monitored of the machine, the at least one condition indicator being defined from machine kinematic data, recording measurements of machine condition data and of process related parameters during a predetermined period during which the machine is operating normally, calculating condition indicator values for the at least one condition indicator for each recorded machine condition data measurement, determining a graph representing the at least one condition indicator value as a function of a first process related parameter chosen from the measured process related parameters, dividing the graph into operating classes, each operating class being representative of different operating conditions of the machine, calculating an alarm level value for each operating class, for each operating class, setting the determined alarm level value at the midpoint of the operating class.

An alarm level is determined for each operating class enhancing the accuracy of the alarm level to detect a defect of the machine at an early stage avoiding false alarms.

Kinematic data is data used to calculate frequencies produced by defect machines or machine components.

Kinematic data is for example a shaft speed of the machine, number of a gear teeth of the machine, bearing dimensions of the machine, the bearing dimensions including number of rolling elements, or a number of blades on impellers of the machine.

Advantageously, the method further comprises connecting the alarm level values by linear interpolations.

Preferably, the alarm level value of each operating class is calculated from a mean value and a standard deviation of the at least one condition indicator values in the considered operating class and a detection factor.

Advantageously, dividing the graph into operating classes comprises determining the lower and upper boundaries of each operating class such that the variations of the at least one condition indicator values in the considered operating class are smaller than an operating class definition threshold.

Preferably, when the learning period is over, if M out of N values of the at least one condition indicator values are above an alarm level value, an alarm is triggered.

Advantageously, the process related parameters comprise a speed of the machine and/or a load applied on the machine and/or vibrations of the machine.

In another aspect, a system for setting alarm levels for a machine is proposed.

The system comprises: defining means to define at least one condition indicator reflecting the condition of the machine with respect to a defect to be monitored of the machine, the at least one condition indicator being defined from the measurements of machine kinematic data, recording means to record measurements of machine condition data and of process related parameters during a predetermined period during which the machine is operating normally, first calculating means to calculate condition indicator values for the at least one condition indicator for each recorded machine condition data measurement, determining means to determine a graph representing the at least one condition indicator value as a function of a first process related parameter chosen from the measured process related parameters, dividing means to divide the graph into operating classes, each operating class being representative of different operating conditions of the machine, second calculating means to calculate an alarm level value for each operating class, setting means to set the determined alarm level value at the midpoint of each operating class.

Preferably, the system further comprises interpolation means to connect the alarm level values by linear interpolations.

BRIEF DESCRIPTION OF THE DRAWINGS

Other advantages and features of the invention will appear on examination of the detailed description of embodiments, in no way restrictive, and the appended drawings in which.

DETAILED DESCRIPTION OF THE INVENTION

Figure 1:
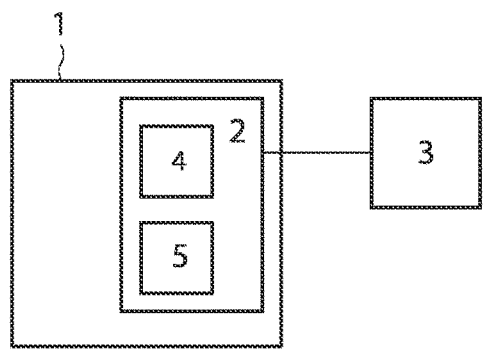
FIG. 1 illustrates schematically an example of an embodiment of a machine according to the invention.

Reference is made to FIG. 1 which represents an example of an embodiment of a machine 1 comprising sensors 2 and a condition monitoring system 3 connected to the sensors 2.

The sensors 2 comprise at least one machine condition sensor 4 and at least one process related parameters sensor 5.

The machine condition sensor 4 generates machine condition data of the machine 1, for example the power output of the machine 1.

The machine condition sensor 4 comprises for example a power sensor.

The process related parameters sensor 5 measure process related parameters of the machine 1.

Process related parameters comprise for example operating speed, load or vibrations.

The sensors 5 comprise for example speed sensors, load sensors and/or sensors configured to measure vibrations applied on the machine 1.

The condition monitoring system 3 comprises defining means, recording means, first calculating means, determining means, dividing means, second calculating means, setting means and interpolation means.

Figure 2:
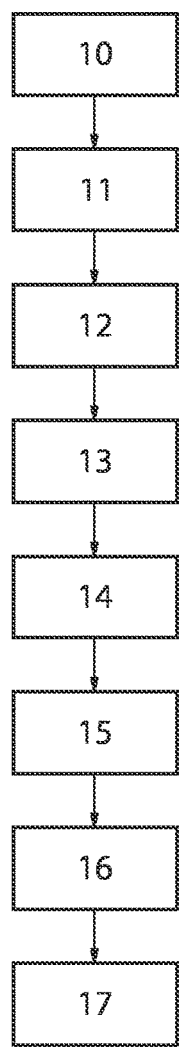
FIG. 2 illustrates an embodiment of a method for setting alarm levels for the machine according to the invention.

FIG. 2 represents an embodiment of a method for setting alarm levels for the machine 1.

In a step 10, the defining means define at least one condition indicator CI reflecting the condition of the machine with respect to a defect of the machine 1 to be monitored.

The condition indicator is defined from machine kinematic data.

The condition indicator CI comprises for example a gear mesh frequency of a gear of the machine 1 equal to a gear main shaft speed times the number of teeth of a gear bearing, the number of teeth of the gear bearing being a kinematic data of the machine 1.

In step 11, during a learning period in which the machine 1 is operating normally, measurements of the process related parameters are recorded by the recording means for a predetermined period.

During the learning period, the machine 1 is operating in all operating conditions that the machine is normally used for.

In step 12, after the learning period, the first calculating means calculate condition indicator values for the condition indicator CI for each recorded machine condition data measurement.

In step 13, the determining means determine a graph GR representing the condition indicator values in function of a first process related parameter chosen from the measured process related parameters. It is assumed that in the following, the first process related parameter is the operating speed of the machine 1.

Then, in step 14, the dividing means divide the graph GR into operating classes OC, each operating class being representative of different operating conditions of the machine.

The lower and upper boundaries of each operating class are determined such that the variations of the condition indicator values in the considered operating class are smaller than an operating class definition threshold.

For example, the operating class definition threshold is equal to 10% of the mean value calculated on all CI values obtained during the learning period.

The graph GR is for example divided into 5 to 10 operating classes, each operating class comprises for example 10 to 20 measurements.

In step 15, the second calculating means calculate an alarm level value AL for each operating class which is equal to:

$$AL = \mu + X.\sigma \quad (1)$$

where $\mu$ is the mean value and $\sigma$ is the standard deviation of the condition indicator values in the considered operating class, and X is a detection factor.

X is for example comprised between 1 and 10.

In step 16, the determined alarm level value is set at the midpoint of each operating class by the setting means.

In step 17, the interpolation means connect the alarm level values together by linear interpolation increasing even more the accuracy of the alarm level between the midpoints of the operating classes.

The condition monitoring system 3 categorizes the operating conditions in multiple operating classes depending on process related parameter being monitored.

Figure 3:
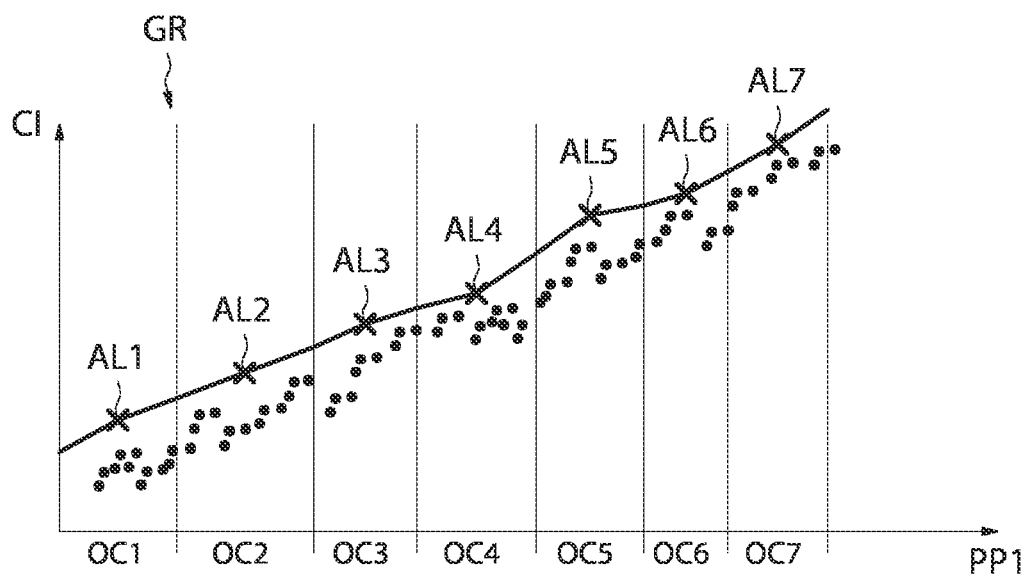
FIG. 3 illustrates an example of a graph of a condition indicator.

FIG. 3 represents an example of the graph GR comprising the condition indicator CI versus the first process related parameter PP1.

The measurements used to define the condition indicator CI are represented by dots.

The graph GR is divided into 7 operating classes OC1 to OC7.

Each operating classes OC1 to OC7 comprises at its midpoint a calculated alarm level value AL1 to AL7 represented by a cross, the alarm level values AL1 to AL7 being connected together by linear interpolation.

When the machine 1 is operating and the learning period is over, if M out of N values of the condition indicator values are above the alarm level value AL1 to AL7, an alarm is triggered, M and N being integers.

For example, M is equal to 4 and N is equal to 7.

The alarm levels are automatically set for different operating conditions without any need of manual input, each operating condition being represented by an operating class on the graph GR.

An alarm level is determined for each operating class enhancing the accuracy of the alarm level to detect a defect of the machine 1 at an early stage avoiding false alarms.

In the illustrated example, one condition indicator reflecting the condition of the machine with respect to a defect to be monitored of the machine is analyzed.

In order to detect more defects, more graphs divided into operating classes and comprising alarm level values are set up as explain above, each graph comprising a different condition indicator reflecting the condition of the machine with respect to a different defect to be monitored of the machine versus the first process related parameter PP1.

The invention claimed is:
1. Method for setting alarm levels for a machine, the method comprising:
defining at least one condition indicator (CI) reflecting the condition of the machine with respect to a defect to be monitored of the machine, the at least one condition indicator being defined from machine kinematic data,
recording measurements of machine condition data and of process related parameters during a predetermined period during which the machine is operating normally, calculating condition indicator values for the at least one condition indicator for each recorded machine condition data measurement, determining a graph representing the at least one condition indicator value, on a vertical axis, as a function of a first process related parameter chosen from the measured process related parameters, dividing the graph into operating classes along a horizontal axis, each operating class being representative of a different operating condition of the machine and having upper and lower boundaries for each operating class, calculating an alarm level value for each operating class based on the statistical characteristics of the condition indicator values for each operating class, and wherein setting the determined alarm level value in the graph at a horizontal axis midpoint of each operating class.

2. The method according to claim 1, further comprising connecting the alarm level values in the graph by linear interpolations.

3. The method according to claim 1, wherein the alarm level value of each operating class is calculated from a mean value and a standard deviation of the at least one condition indicator values in the considered operating class and a detection factor.

4. The method according to claim 1, wherein dividing the graph into operating classes comprises determining the lower and upper boundaries of each operating class such that the variations of the at least one condition indicator values in the considered operating class are smaller than an operating class definition threshold.

5. The method according to claim 1, wherein when the learning period is over, if M out of N values of the at least one condition indicator values are above an alarm level value, an alarm is triggered.

6. The method according to claim 1, wherein the process related parameters comprise a speed of the machine and/or a load applied on the machine and/or vibrations of the machine.

7. A system for setting alarm levels for a machine comprising:

the system configured to define at least one condition indicator reflecting the condition of the machine with respect to a defect to be monitored of the machine, the at least one condition indicator being defined from the measurements of machine kinematic data, the system further configured to record, by one or more sensors, measurements of machine condition data and of process related parameters during a predetermined period during which the machine is operating normally, the system further configured to perform a first calculation to calculate condition indicator values for the at least one condition indicator for each recorded machine condition data measurement, the system further configured to determine a graph representing the at least one condition indicator value, on a vertical axis, as a function of a first process related parameter chosen from the measured process related parameters, the system further configured to divide the graph into operating classes along a horizontal axis, each operating class being representative of a different operating condition of the machine and having upper and lower boundaries for each operating class, the system further configured to perform a second calculation to calculate an alarm level value for each operating class based on the statistical characteristics of the condition indicator values for each operating class, the system further configured to set the determined alarm level value in the graph at a horizontal axis midpoint of each operating class.

8. The system according to claim 7, further comprising the system further configured to perform an interpolation to connect the alarm level values in the graph by linear interpolations.

* * * * *